Jan. 10, 1961     S. T. RICHARDSON     2,967,732
RAIN SHIELD ATTACHMENT FOR VEHICLES

Filed April 2, 1958     2 Sheets-Sheet 1

SHURMAN T. RICHARDSON,
INVENTOR.

BY Donald E. Windle.
ATTORNEY.

Jan. 10, 1961 S. T. RICHARDSON 2,967,732
RAIN SHIELD ATTACHMENT FOR VEHICLES
Filed April 2, 1958 2 Sheets-Sheet 2

SHURMAN T. RICHARDSON,
INVENTOR.

BY Donald E. Windle
ATTORNEY.

United States Patent Office 2,967,732
Patented Jan. 10, 1961

2,967,732

RAIN SHIELD ATTACHMENT FOR VEHICLES

Shurman T. Richardson, Richmond, Ind.
(13446 Gulf Blvd., Mederia Beach, St. Petersburg 8, Fla.)

Filed Apr. 2, 1958, Ser. No. 725,992

2 Claims. (Cl. 296—95)

The present invention relates to a rain shield of novel construction which is readily adapted to be secured to or removed from the windshield of an automotive vehicle. The device provides protection to the windshield from rain while the occupants of the vehicle are enjoying the viewing of motion pictures in a drive-in theatre, or watching parades and the like.

The principal object of the invention is the provision of a device which may be easily secured to and detached from a windshield for protection thereof from rain.

A second object is the provision of a shield which may be attached to the windshield of an automobile to prevent an accumulation of snow thereon.

A third object is the provision of a shield which is adapted to be removably secured to either the windshield or the rear glass of an automobile to protect the same from the falling elements of the weather.

A further object is the provision of a device which is capable of being stored in compact form while not in use.

A still further object is the provision of an article which is simple of construction and economical to manufacture.

Other particular objects and advantages of the invention will become more apparent in the course of the following description and that which is new will be pointed out in the appended claims.

The presently preferred embodiment of the invention is shown in the accompanying drawings forming a part hereof, in which.

Like characters of reference designate like parts throughout the several views of the drawings.

Figure 1:
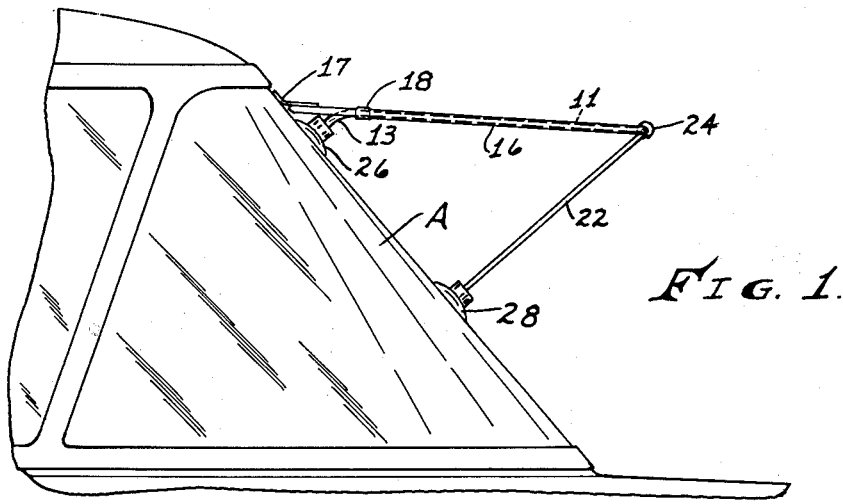
Figure 1 is a side elevation of an automobile windshield showing a rain shield removably secured thereto, with the same embodying the features of the invention.

Referring now to the drawings in detail, A designates the windshield of an automotive vehicle to which the device is shown attached.

The rain shield has a frame which is preferably formed of wire or other suitable material. The forward edge portion 10 of the frame has the side members 11 and 12 formed integrally therewith and turned at substantially right angles with relation thereto. The side members 11 and 12 have the rearwardly projecting ends curved slightly and forming suction cup-receiving portions 13 and 14 respectively.

A filler member 15 is provided to substantially fill the space formed by the frame member, with the rear edge of the filler member extending a short distance beyond the end portions 13 and 14 of the frame member.

Figure 5:
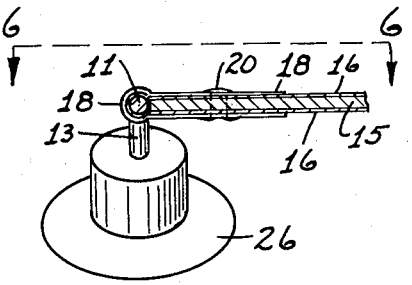
Figure 5 is a detail section through one edge of the device, taken on line 5—5 of Figure 2.
Figure 3:
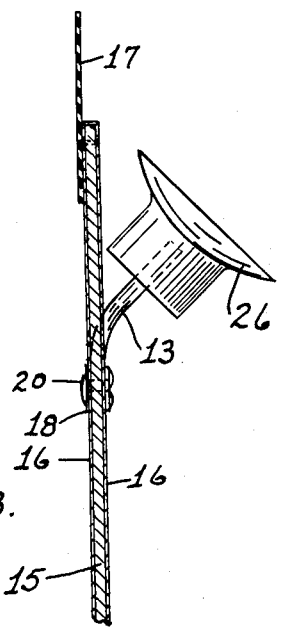
Figure 3 is a detail vertical section through the upper edge portion of the rain shield, taken on line 3—3 of Figure 2.
Figure 4:
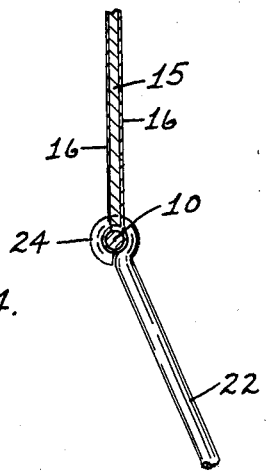
Figure 4 is a detail section through the lower edge of the rain shield, taken on line 4—4 of Figure 2.
Figure 6:
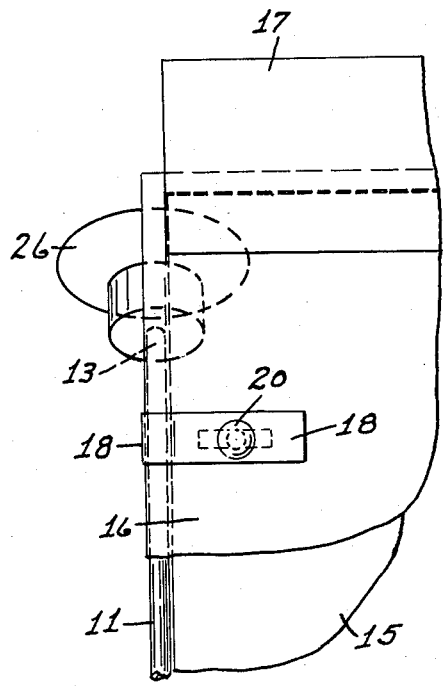
Figure 6 is a partial detail plan of one of the upper corners of the device, taken from line 6—6 of Figure 5.

A cover member 16 is provided to enclose both the frame and the filler member with the same being preferably formed to snugly fit over the members and having one edge thereof open for the insertion of the frame and the filler. The cover member 16 is fitted over the frame and the filler so the open edge of the cover is at the rear edge of the members, and with there being slots formed in the side edges to permit the suction cup-receiving portions 13 and 14 to project through the cover, as more clearly shown in Figures 1, 3 and 5. The cover 16 is of such dimensions to permit the open edges thereof to lap over the rear edge of the filler, as shown in Figure 3. A flexible edge member 17 is provided along the rear edge of the filler member and is located on the opposite side of the filler with relation to the curved suction cup-receiving portions 13 and 14 of the frame. The edge member 17 is preferably formed of rubber or other suitable material and is secured along the edge of the filler member by sewing through the lapped edges of the cover member and the filler, as more clearly shown in Figures 3 and 6.

Securing clips 18 and 19 are provided at the edges of the assembled device and are secured thereon by means of respective rivets 20 and 21. The clips prevent slipping or shifting of the filler member with relation to the frame and the cover.

Figure 2:
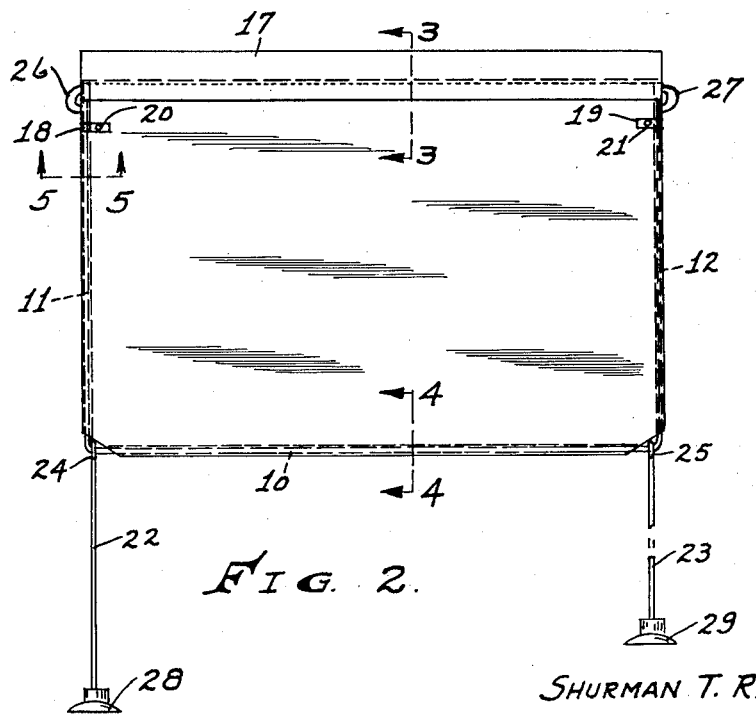
Figure 2 is a detail elevational view of the rain shield.

Supporting braces 22 and 23 are secured around the frame members at the forward corners thereof by means of respective eyes 24 and 25. It will be noted, by referring to Figure 2 that a small portion of the filler 15 and the cover 16 are cut away at the forward corners to permit engagement of the eyes 24 and 25 with the frame. The eyes 24 and 25 are fitted loosely onto the frame member and may easily be swung from one position to another. The braces 22 and 23 are adapted, through their swinging movement, to lie against the surface of the shield.

Suction cups 26, 27 are fitted to ends 13 and 14 of the frame member and suction cups 28 and 29 are fitted to the ends of braces 22 and 23 for removably securing the device to a windshield, as shown in Figure 1.

The filler of the rain shield provides space for printed advertisements and the like which may be visible through the cover 16 if the cover is made of transparent material such as sheet plastic.

In the use of the device, the same is attached at the rear edge thereof to a windshield by means of the suction cups 26 and 27 with the edge member 17 lying against the surface of the windshield. The forward edge portion of the rain shield is adjusted with relation to the windshield by the placement of suction cups 28 and 29 against the surface of the windshield, as shown in Figure 1. The attachment of suction cups 28 and 29 in supporting relation to the forward edge of the device causes the edge strip 17 to be flexed and fitted tightly against the surface of the windshield, as shown in Figure 1.

Other than preventing rain from striking the windshield, the rain shield also is adapted to prevent snow or sleet from falling on the windshield. The rain shield is also a protection to the windshield against frost settling thereon.

Due to the method of attachment of the rain shield to the windshield, the same is capable of being readily attached to or removed from the windshield. Also, due to the construction of the rain shield, the same, when removed from the windshield, requires but a minimum of storage space.

While the device is shown and described in its presently preferred form, I desire that it be understood that minor changes may be made therein, insofar as the changes may fall within the scope of the appended claims.

Having now fully shown and described the invention and its use, what I claim and desire to secure by Letters Patent of the United States, is:

1. A rain shield composed of a frame extending about a portion thereof, a filler member positioned in the frame, a cover member extending over the frame and the filler, clamping members secured over opposite edges of the rain shield and secured therethrough, means connected at each of the corners of the rain shield providing for removably securing the four corners of the rain shield in spaced relation to the surface of a windshield, and with all of said securing means being removably secured directly to the windshield.

2. In a rain shield, a frame formed to provide three sides with the end portions of the frame extending in the same direction and curved out of alignment with the major portion of the frame, a filler located in and having three edges thereof adjacent the frame, a cover extending over the frame and the filler and secured therethrough, suction cups attached to the end portions of the frame, a pair of braces swingably secured to the frame intermediate its ends, a suction cup attached to the free end of each of the braces, with the suction cups providing means through which the rain shield is adapted to be removably secured directly to the surface of a windshield, and with the braces providing means adjusting one edge of the rain shield with relation to the windshield.

References Cited in the file of this patent
UNITED STATES PATENTS

| | | |
|---|---|---|
| 1,481,010 | Hopewell | Jan. 15, 1924 |
| 1,494,864 | Notman | May 20, 1924 |
| 1,500,091 | Weiske et al. | July 1, 1924 |
| 2,121,264 | Rubottom | June 21, 1938 |
| 2,502,838 | Garceau | Apr. 4, 1950 |
| 2,716,572 | Soucy | Aug. 30, 1955 |

FOREIGN PATENTS

| | | |
|---|---|---|
| 1,043,515 | France | June 10, 1953 |